Nov. 14, 1950 F. E. BERTRAND 2,529,793
APPARATUS AND METHOD FOR USE IN MAKING
RIBBED STRIPS FOR INSOLES
Filed March 30, 1946 10 Sheets-Sheet 2

*Inventor*
*Frederic E Bertrand*
By his Attorney

Nov. 14, 1950  F. E. BERTRAND  2,529,793
APPARATUS AND METHOD FOR USE IN MAKING
RIBBED STRIPS FOR INSOLES
Filed March 30, 1946  10 Sheets-Sheet 4

Inventor
Frederic E Bertrand.
By his Attorney

Nov. 14, 1950     F. E. BERTRAND     2,529,793
APPARATUS AND METHOD FOR USE IN MAKING
RIBBED STRIPS FOR INSOLES
Filed March 30, 1946     10 Sheets-Sheet 5

Inventor
Frederic E Bertrand
By his Attorney.

Inventor
Frederic E Bertrand
By his Attorney

Inventor
Frederic E Bertrand
By his Attorney

Nov. 14, 1950     F. E. BERTRAND     2,529,793
APPARATUS AND METHOD FOR USE IN MAKING
RIBBED STRIPS FOR INSOLES
Filed March 30, 1946     10 Sheets-Sheet 9

Inventor.
Frederic E Bertrand
By his Attorney

Patented Nov. 14, 1950

2,529,793

UNITED STATES PATENT OFFICE 2,529,793

APPARATUS AND METHOD FOR USE IN MAKING RIBBED STRIPS FOR INSOLES

Frederic E. Bertrand, Lynn, Mass., assignor to United Shoe Machinery Corporation, Flemington, N. J., a corporation of New Jersey Application March 30, 1946, Serial No. 658,378

11 Claims. (Cl. 154—1.8)

This invention relates to the manufacture of ribbed strips adapted for attachment to insoles to provide sewing ribs thereon, and to apparatus and methods for use in making such strips.

Objects of the invention are to provide improved apparatus for use in manufacturing the ribbed strips referred to, and to provide an improved method of making such strips.

To the accomplishment of these objects, the invention provides, in accordance with one aspect, an improved apparatus for use in the manufacture of ribbed strips, which comprise a plurality of superimposed layers, the apparatus having, in combination, mechanism for folding layers of the strip to form a rib while holding one layer in an unfolded condition to provide a base for the rib, rolls for drawing the strip progressively through the folding mechanism and for pressing the rib, means for applying cement to the strip, and means for securing a separate strip of material to the cemented portions of the strip to reinforce said portions. As illustrated herein, the folding mechanism includes means for guiding the strip to the feeding and pressing rolls, said means being constructed and arranged to fold the upper layers of the strip toward each other while holding the lower layer in an unfolded condition, the pressing rolls operating to draw the strip progressively through the guiding means and acting simultaneously to press the folded portions of the upper layers together to form the rib. A roll located opposite the pressing rolls serves to maintain the unfolded layer in a substantially flat position during the pressing operation, thereby providing a base for the rib which forms flanges at the inner and outer sides of the rib.

The means for applying cement to the strip, as herein illustrated, consists of a plurality of rolls constructed and arranged automatically to apply a coating of cement to one side of the rib and to the surface of the base adjacent to such side, the portions of the strip receiving the cement, in accordance with the present invention, being the inner side of the rib and the surface of the base adjacent to said inner side. After the cement is applied, means is provided in the apparatus arranged to conduct a separate strip of precemented material into position to be applied to the cemented portions of the strip and then to secure the separate strip to said cemented portions to reinforce the ribbed strip, the reinforcing layer or strip extending beyond the base layer inwardly of the rib to provide a reinforcement for the body portion of the insole to which the strip is applied. As illustrated herein, the reinforcing means includes a guide for conducting the separate strip to the ribbed strip in a position to be readily applied to the ribbed strip, and it also includes members constructed and arranged to press the reinforcing strip progressively against the base and rib to cause it to become permanently attached thereto by reason of the cement between the parts, said members operating to press the reinforcing strip into the angle between the rib and base at the inner side of the rib. Further means is provided for compressing or flattening the ribbed strip progressively after the reinforcing operation is completed, thereby putting the strip into a condition which permits it to be readily wound upon a spool or reel and thus facilitates handling the strip or reeling it for shipment.

In accordance with another aspect, the invention provides an improved method of making ribbed strips for attachment to insoles to form sewing ribs thereon which, as herein illustrated, consists in providing a composite strip comprising a plurality of superimposed layers secured together along their mid portions, folding the free margins of the upper layers of the strip toward each other while holding the lower layer in an unfolded condition, pressing the folded margins of the upper layers together to form a rib while maintaining the unfolded layer substantially flat to provide a base for the rib, applying cement to one side only of the rib and to the surface of the base adjacent to that side, and securing a separate strip of material progressively to the cemented portions of the rib and base to reinforce the strip, the reinforcing strip being located substantially flush with the upper end of the rib but extending beyond the base a substantial distance inwardly of the rib to provide a wide reinforcement for the body of the insole to which the strip is attached. As illustrated, the method also includes the step of compressing or flattening the ribbed strip after the reinforcing operation by pressing the rib downwardly against the base, thereby putting the strip into a condition which permits it to be readily wound upon a spool or reel and thus facilitates handling the strip or reeling it for shipment, the flattening operation, however, being of such a nature that the rib is not permanently flattened against the base but will react and return to an inclined position when tension or pressure on the strip is relieved as, for example, when the strip is ready to be applied to an insole.

With the above and other features and aspects in view, the invention will now be described in detail in connection with the accompanying drawings and will thereafter be pointed out in the claims.

Figures 1, 2:
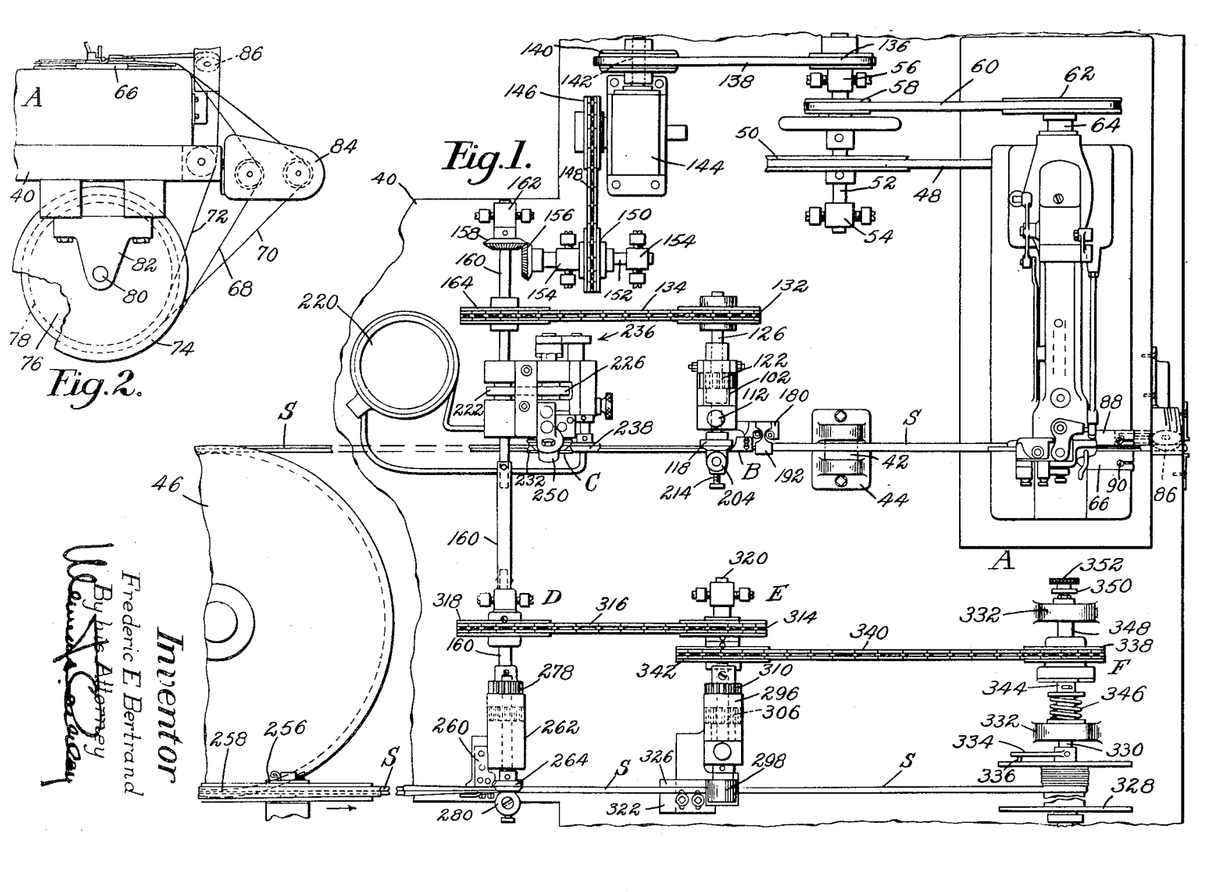
Fig. 1 is a plan view of the apparatus embodying the present invention.
Fig. 2 is an enlarged detail view in front elevation of the reels which supply the strips to the apparatus.

The apparatus for use in manufacturing ribbed strips, as illustrated in Fig. 1, comprises a series of operating units or devices mounted on a support or platform 40 and adapted to operate successively on a composite strip S as the layers forming the strip are fed to the apparatus from a plurality of reels rotatably mounted under the platform. The first operating device of the apparatus comprises a sewing machine A constructed and arranged to sew the layers of the strip together in superimposed relation by a double row of stitches L (Fig. 8), preferably lockstitches, located substantially along the longitudinal median portions of the layers. The strip then travels over a roll 42 rotatable in a bracket 44 on the platform 40 and passes into the second operating device B.

The device B constitutes a rib folding and pressing device which folds the opposite margins of the upper layers of the multi-ply strip into a position to form a rib, the device being provided with means including a pair of frusto-conical rolls constructed and arranged to apply pressure to the folded margins to form them into a rib. The lower layer of the strip is not folded by the device but is maintained in an unfolded condition to provide a base for the rib.

The strip passes from the folding device into the third operating device C of the apparatus which, as illustrated in Fig. 1, comprises a cementing device adapted to apply cement to the inner side of the rib and to the surface of the base of the rib adjacent to said inner side.

After passing through the cementing device C, the ribbed strip S passes around a large drum 46 rotatably mounted on the platform 40 at a sufficient distance from the cementing device to provide time for the cement to dry or become tacky, the strip traveling around the drum and returning to enter the fourth operating device D of the apparatus, which is constructed and arranged to apply a separate strip of reinforcing material, such as fabric or Gem duck, to the cemented portions of the ribbed strip, that is, to the inner side of the rib and the surface of the base of the strip adjacent to said inner side. The operating device D comprises a pair of cooperating rolls for applying the reinforcing strip progressively to the rib, guides for conducting both the ribbed strip and the reinforcing strip to the rolls, and a supporting roll adapted to engage the lower layer or base of the strip to maintain the strip in a proper position between the rolls and also to support the base layer in a substantially flat position as the strip passes through the device.

After the strip has been reinforced in the manner indicated, it passes forwardly or to the right, as viewed in Fig. 1, into the fifth operating device E of the apparatus, this device being adapted to apply pressure to the reinforced strip in such a manner that the rib will be forced downwardly against the base of the strip with sufficient pressure to hold the strip in a relatively flat position until it is to be applied to an insole or wound upon a spool or reel for shipment. The operating device E is provided with a pair of cylindrical rolls adapted to compress the strip as it is guided between the rolls by guiding means located adjacent thereto.

The ribbed strip S, in the flattened condition into which it has been pressed, is then wound automatically upon a reel rotatably mounted in a reeling apparatus F positioned on the platform substantially opposite the sewing machine. When the reel is full it may be disconnected from the mechanism, the strip being then in a proper condition to be applied to an insole either by hand or by a strip attaching machine adapted to apply the strip progressively to the outer surface of the insole, such a machine being disclosed, for example, in United States Letters Patent No. 2,410,004, granted October 29, 1946, upon my application.

The operating devices of the apparatus are driven from a single source of power provided by a motor (not shown) preferably located under the platform 40 below the sewing machine A. As indicated in Fig. 1, the motor is connected by a belt 48 to a pulley 50 secured to a shaft 52 rotatably mounted in bearings 54, 56 provided on the platform. Rearwardly of the pulley 50 the shaft 52 carries a smaller pulley 58 connected by a belt 60 to a pulley 62 secured to the driving shaft 64 of the sewing machine. The sewing machine is preferably a conventional type two-needle lockstitch machine adapted to insert two rows of stitches L through the layers of the multi-ply strip as the latter is drawn through the machine from the reels previously referred to. The sewing machine is constructed and arranged to insert the two rows of stitches in close proximity to each other as the strip is guided into the machine by guiding means 66 carried by the machine adjacent to its operating instrumentalities.

Figures 7, 8:
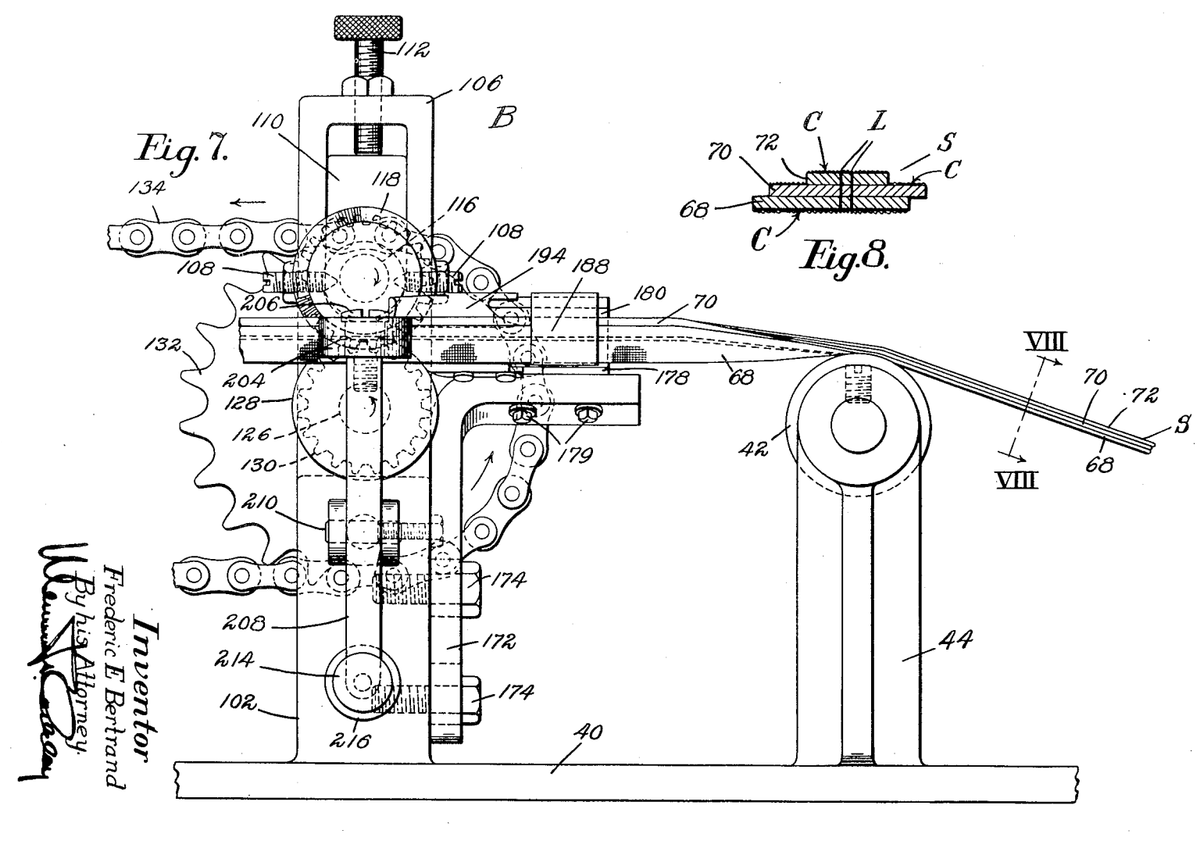
Fig. 7 is a front elevation of the second operating unit of the apparatus which comprises a folding and forming device.
Fig. 8 is a transverse section on a greatly enlarged scale of the strip after the layers or plies thereof have passed through the sewing machine and have been secured together along their longitudinal median portions by two adjacent rows of stitches.

The composite strip S, as illustrated in Fig. 8, comprises three superimposed layers of fabric material secured together substantially along their longitudinal median portions by the double row of stitches L. The lower layer 68 of the strip forms the base and the free margins of the two upper layers 70 and 72 are folded upwardly about the stitches to form an upstanding rib, the upper surfaces of the layers 70, 72 being precoated with pressure-responsive cement C and the lower surface of the base layer 68 being likewise precoated with such cement. The lower layer 68 is approximately $\frac{7}{16}$" wide and the intermediate layer 70 is preferably a little wider, for example, $\frac{1}{2}$". The upper layer 72, which ultimately forms the inner portion or core of the rib, is approximately $\frac{1}{4}$" wide.

Figures 28, 29, 30, 31:
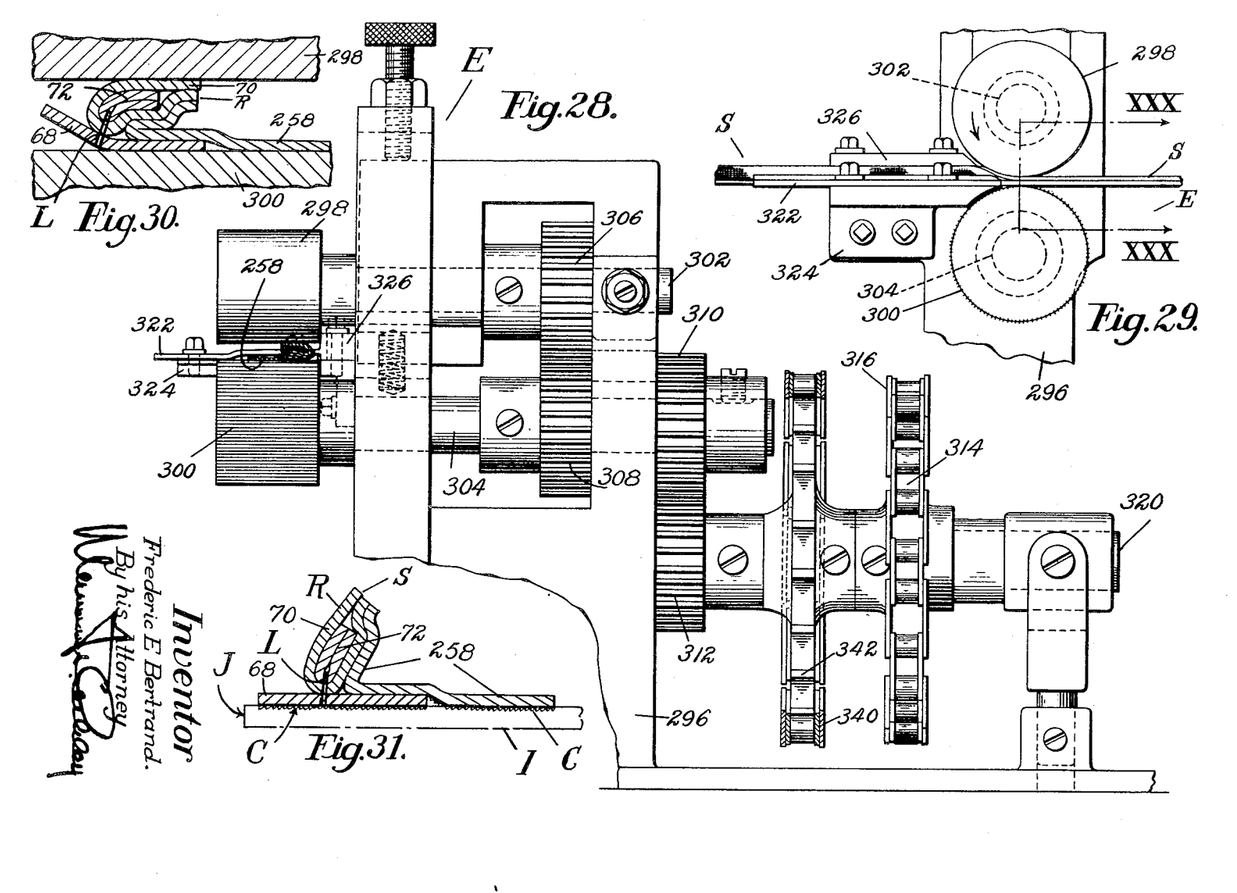
Fig. 28 is a side elevation of the fifth operating device of the apparatus comprising strip compressing or flattening mechanism.
Fig. 29 is a front elevation of the rolls and guiding mechanism of the device illustrated in Fig. 28.
Fig. 30 is a transverse section taken on the line XXX—XXX of Fig. 29 showing the ribbed strip passing between the flattening rolls, the view being on a greatly enlarged scale.
Fig. 31 is a transverse section of the ribbed strip after it has passed through the apparatus and is ready to be applied to an insole, the insole being shown in broken lines.

The completed ribbed strip S formed by the present apparatus is illustrated in Fig. 31 as applied to the outer surface of an insole I, the insole being indicated in broken lines to show the position of the strip relatively to the insole. It will be seen in this figure that the lower layer 68 of the composite strip forms a base consisting of a relatively narrow outer flange overlying the margin or feather of the insole adjacent to its edge face J, the base layer 68 also forming an inner flange somewhat wider than the outer flange. The narrow upper layer 72 of the strip forms the inner portion or core of a rib R on the strip and this core is covered or enclosed by the intermediate layer 70 which extends a short distance above the core. The inner side of the rib R, that is, the side farthest from the edge J of the insole, is covered by a reinforcing strip which also extends over the inner flange of the base and projects a substantial distance inwardly beyond this inner flange, as will be later explained, to reinforce a considerable area of the insole body inwardly of the rib.

As illustrated in Fig. 2, the layers or strips of material forming the ribbed strip S are supplied to the apparatus from three reels 74, 76 and 78 rotatably mounted on a shaft 80 secured in a pair of brackets 82 fastened to the lower side of the platform 40. The three strips pass upwardly from the reels around idler pulleys rotatably mounted in the platform and in a bracket 84 secured to the platform, the lower strips 68 and 70 passing directly into the guiding means 66 of the sewing machine and the upper strip 72 extending upwardly around a second pulley 86 and then inwardly above the other strips into the guiding means.

Figures 3, 4:
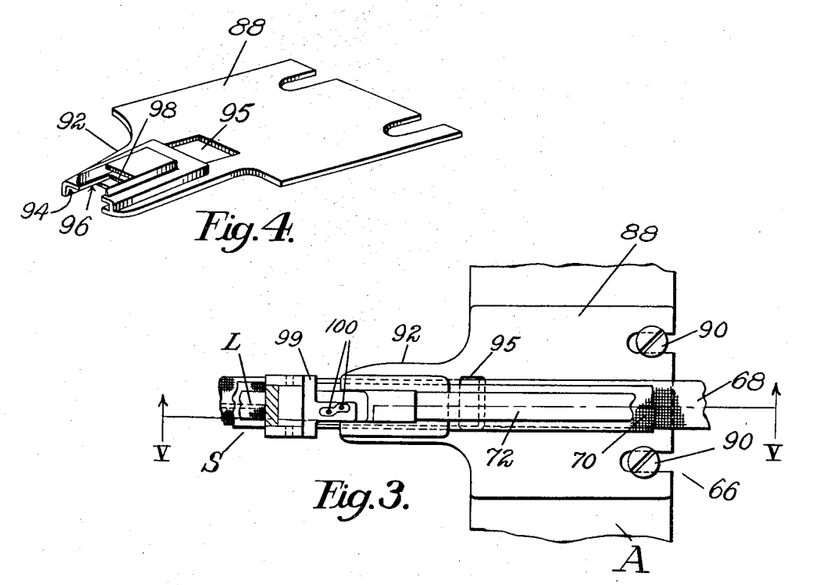
Fig. 3 is an enlarged plan view of means for guiding the strips to the first operating device of the apparatus which comprises a sewing machine.
Fig. 4 is a perspective view of the guiding means.
Figure 5:
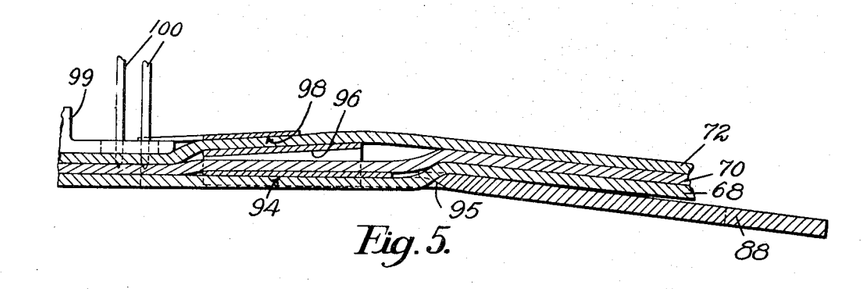
Fig. 5 is an enlarged longitudinal section taken on the line V—V of Fig. 3.
Figure 6:
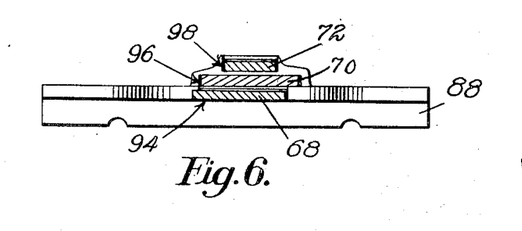
Fig. 6 is a detail view of the guiding means as seen from the left in Fig. 3.

As best illustrated in Figs. 3 to 6, inclusive, the guiding means 66 comprises a plate 88 adjustably secured by screws 90 to the sewing machine A and being reduced in width at its left-hand portion, as viewed in Figs. 3 and 4, to form a lateral extension 92 provided with a lower slot 94 for receiving the lower strip 68 through an opening 95 and guiding said strip, an intermediate slot 96 for guiding the middle or intermediate layer 70, and an upper slot 98 for receiving and guiding the upper layer 72. Fig. 6 illustrates the relative positions of the three layers or strips after they have been threaded into the slots in the guide 88. As illustrated in Figs. 1, 3 and 5, the three layers forming the multi-ply strip pass from the guide 88 directly to the operating instrumentalities of the sewing machine A, the machine being provided with a presser foot 99 and a pair of needles 100 for inserting the double row of lockstitches L which secure the three layers permanently together in the manner indicated above.

The composite strip S then passes toward the left, as viewed in Fig. 1, over the roll 42 and into the second operating device B of the apparatus which is constructed and arranged to fold the opposite free margins of the two layers 70, 72 of the strip toward each other and away from the base layer 68 and to press the folded margins together to form a rib while maintaining the base layer in a substantially flat condition.

Figure 9:
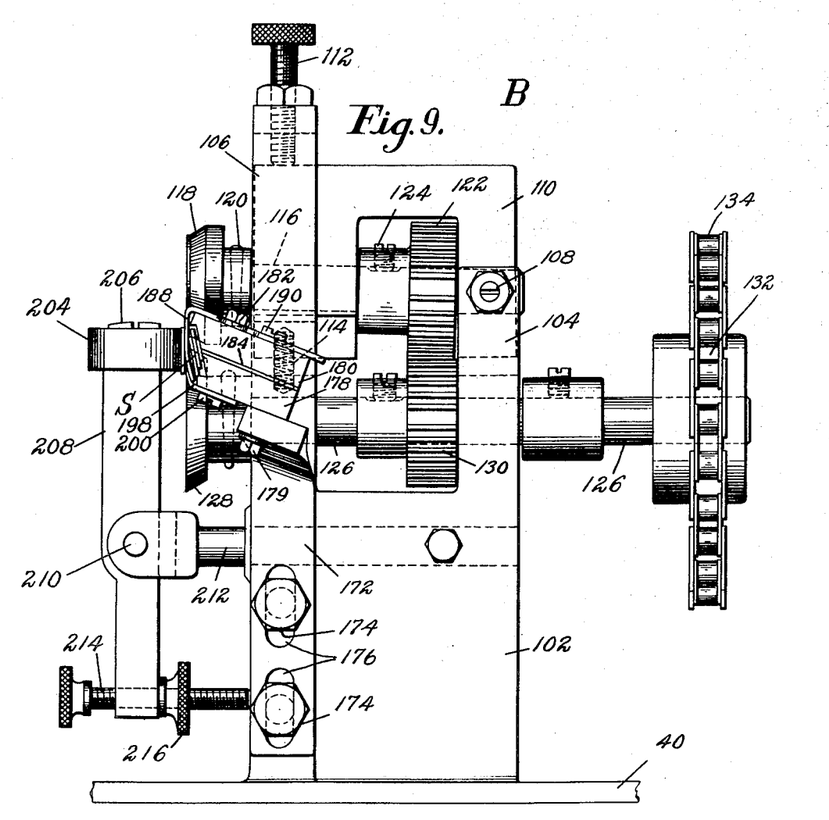
Fig. 9 is a side elevation of the second operating device as viewed from the right in Fig. 7.

The operating device B, as illustrated in Figs. 7 and 9, comprises a base 102 mounted on the platform 40 and provided at its upper portion with uprights 104, 106, the latter of which is in the form of a yoke. Pivotally mounted on these uprights by a pair of pointed screws 108 is a U-shaped member 110 which is normally held upwardly about its pivots against an adjusting screw 112 by a compression spring 114 interposed between the base and the member 110, the screw 112 being threaded through the yoke 106. Adjustment of the screw 112 moves the member 110 about its pivots 108 to vary its heightwise position relatively to the base 102. The member 110 has a shaft 116 rotatably mounted therein on the left-hand end of which, as viewed in Fig. 9, is a frusto-conical roll 118 secured by a taper pin 120, the roll forming the upper member of cooperating rolls which receive the composite strip from the sewing machine A and apply pressure to the folded margins of the upper layers of the strip to form the rib. A pinion 122 is secured to the shaft 116 by a setscrew 124, the pinion being located between the legs of the U-shaped member 110.

Rotatably mounted in the base 102 below the shaft 116 is another shaft 126 having a frustoconical roll 128 secured thereto shaped and arranged to cooperate with the roll 118 in receiving the strip S and in pressing the rib forming layers of the strip together, the shaft 126 having a pinion 130 thereon meshing with the pinion 122 for driving the shafts at equal speeds in opposite directions. At its right-hand end, as viewed in Fig. 9, the shaft 126 carries a sprocket wheel 132 which, through a chain 134, is driven in a counterclockwise direction as viewed in Fig. 7, the chain being connected through mechanism presently to be described to the power drive of the apparatus furnished by the motor referred to above.

Figure 17:
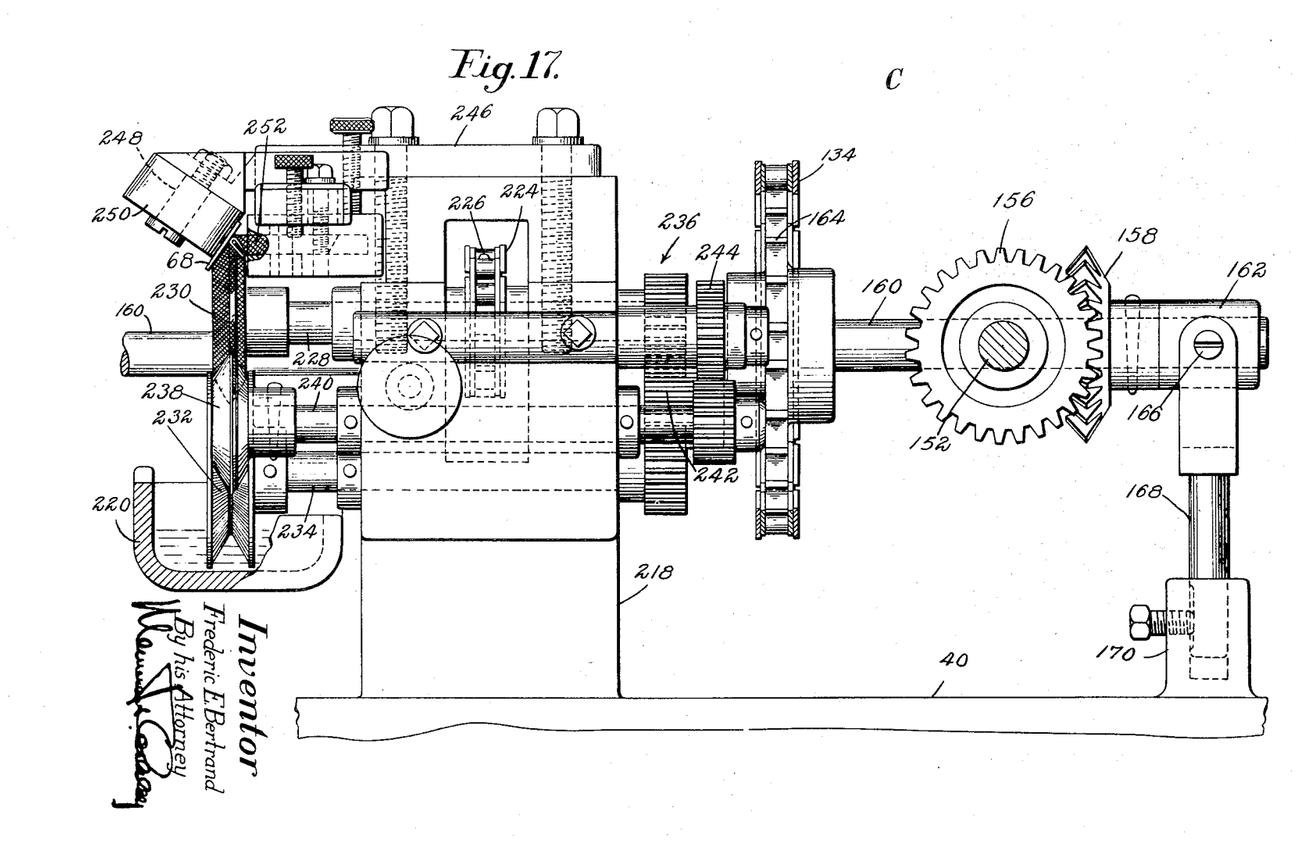
Fig. 17 is a side elevation of the third operating device of the apparatus which comprises a cementing device.

The mechanism for driving the chain 134 and sprocket 132 comprises a pulley 136 (Fig. 1) secured to the shaft 52 and connected by a belt 138 to a pulley 140 secured to a shaft 142 rotatable in a gear box 144 containing reducing gears which provide the proper gear reduction between the sewing machine and the operating devices making up the rest of the apparatus. The reducing gears drive a sprocket 146 mounted on the gear box at right angles to the pulley 140, this sprocket being connected by a chain 148 to a sprocket 150 secured to a shaft 152 rotatably mounted in bearings 154 provided on the platform 40. The shaft 152 carries a bevel gear 156 which meshes with a bevel gear 158 secured to a shaft 160, the latter being rotatable in a bearing 162 on the platform and another bearing in the cementing device C, as shown in Fig. 1. The shaft 160 has a sprocket wheel 164 secured thereto over which the chain 134 runs, thereby connecting the sprocket 132 to the driving mechanism of the apparatus. As illustrated in Fig. 17, the bearing 162 comprises a bushing pivoted between a pair of pointed screws 166 carried by an upright 168 secured in a boss 170 formed on the platform 40, this same construction being preferably employed for the bearings 54 and 56 previously referred to and for similar bearings elsewhere in the apparatus.

Figure 10:
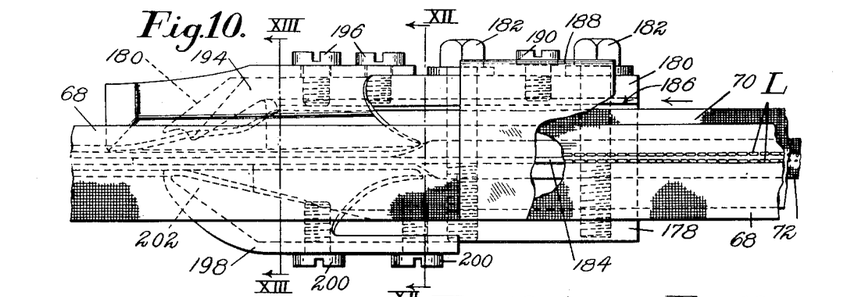
Fig. 10 is a front elevation on an enlarged scale of strip folding mechanism associated with the second operating device.
Figure 11:
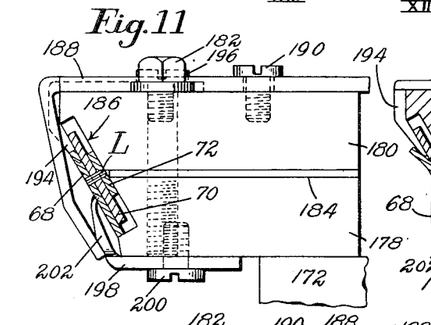
Fig. 11 is an end view of the folding mechanism as viewed from the right in Fig. 10.
Figures 12, 13:
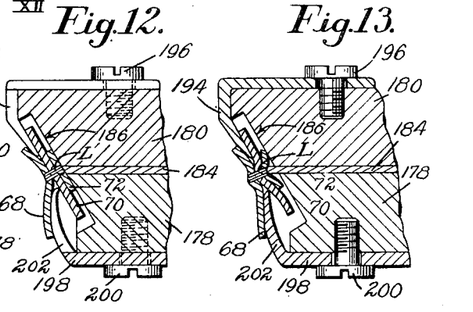
Fig. 12 is a vertical section through a portion of the folding mechanism taken on the line XII—XII of Fig. 10.
Fig. 13 is a section similar to Fig. 12 taken on the line XIII—XIII of Fig. 10.

The means for folding the rib-forming layers of the strip toward each other to form the rib is illustrated in detail in Figs. 10 to 15, inclusive, this means, as shown in Figs. 7 and 9, being mounted on the base 102 of the device B by means of an L-shaped bracket 172 adjustably secured to the base by screws 174 extending through slots 176. The folding means comprises a lower block 178 and an upper block 180 secured to the bracket 172 by screws 179 and secured together by screws 182, the blocks having mounted between them a thin plate or blade 184. The forward surfaces of the blocks are beveled rearwardly from top to bottom, as shown in Figs. 11 to 13, and are recessed at their central portions to provide an inclined slot 186 which forms a guideway for receiving the multi-ply strip S and guiding it to the rolls 118, 128. The plate 184 is substantially flush with the bottom surface of the slot 186 at the receiving end of the folding member but projects gradually forwardly into the slot toward its opposite end so that the plate will engage the strip S along the stitches L and provide an abutment or shoulder about which the margins of the two upper layers may be folded in forming the rib.

Figure 14:
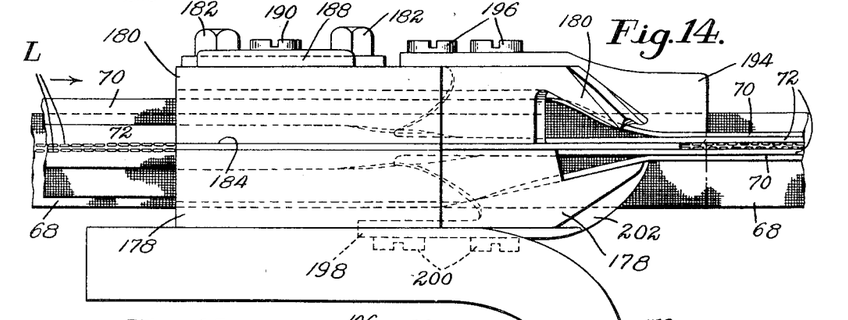
Fig. 14 is a view of the folding mechanism as seen from the right in Fig. 11.
Figure 15:
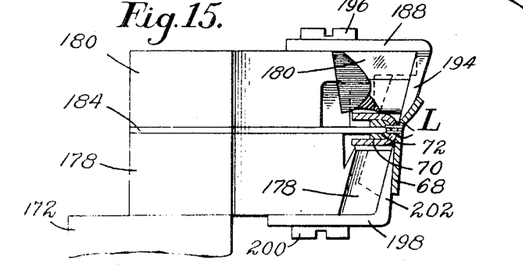
Fig. 15 is an end view of the folding mechanism as seen from the right in Fig. 14.

The slot 186 is covered near the receiving end of the folder by an L-shaped plate 188 which is secured to the blocks by a screw 190 and overhangs the slot to retain the strip S therein. Mounted on the upper block 180, to the left of the plate 188, is a strip folder 194 secured to the block by screws 196 and having a downwardly projecting portion which is shaped as illustrated in Fig. 10 to extend in front of the slot 186 and is arranged to enter between the margins of the two layers 68 and 70, of the strip S and to fold the margins of the layers 70, 72 away from the base layer 68. The shape of the left-hand portion of the block 180, behind the folder 194 is such that, when the strip reaches the leaving end of the folding member, as illustrated at the right in Fig. 14, the free margins of the layers 70, 72 will have been folded substantially at right angles to the base 68 and into engagement with the plate 184, as shown in Fig. 15. Progressive stages of the folding of the margins of the two upper layers 70, 72 of the strip are illustrated in Figs. 11 to 13, and Fig. 15, the strip in Fig. 15 being shown as leaving the folding member and about to enter the rib forming rolls 118, 128.

Mounted on the lower block 178 of the folding member, substantially opposite the folder 194 is a similar folder 198 secured to the block by screws 200 and provided with an upwardly projecting portion 202 which extends in front of the slot 186 and enters between the lower margins of the two layers 68 and 70 of the strip and folds the margins of the layers 70, 72 away from the base layer 68 (Figs. 12 and 13). The block 178 is shaped so that, upon leaving the folding member, the lower margins of the layers 70, 72 will be folded into engagement with the plate 184 and located substantially at right angles to the base layer 68, as illustrated in Figs. 14 and 15. When the opposite margins of the two layers 70, 72 have been folded into the positions just described, the strip S has reached the end of the folding member and is ready to enter the rib forming and pressing rolls 118 and 128, this stage of the operation being illustrated in Fig. 16.

Figure 16:
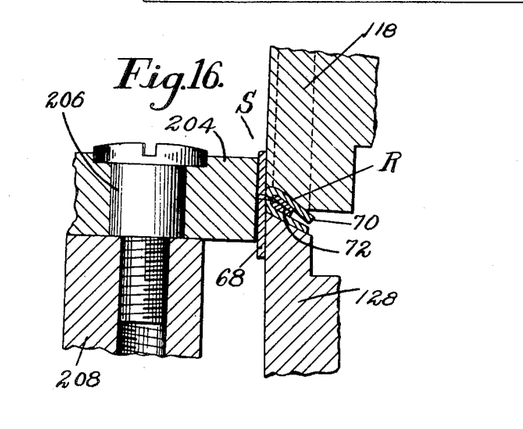
Fig. 16 is an enlarged vertical section through the operating portions of the device shown in Fig. 9.

In order to hold the multi-ply strip between the rolls 118, 128, and to maintain the base layer 68 in a substantially flat condition during the pressing operation, the device B is provided, opposite the rolls 118, 128, with a cylindrical roll 204 rotatable on a screw 206 mounted in the upper end of a vertical lever 208, the lever being pivoted on a pin 210 carried by a rod 212 secured in the base 102. The lever 208 has a screw 214 threaded through its lower end for engaging the base 102 and controlling the position of the roll 204 relatively to the rolls 118, 128, a lock nut 216 being provided for securing the screw in adjusted position. Fig. 16 illustrates the manner in which the cylindrical roll 204 cooperates with the frustoconical rolls 118, 128 in operating upon the strip S, the rolls 118, 128 receiving the strip progressively from the sewing machine and folding member and pressing the folded margins of the two upper layers 70, 72 toward each other to form the rib R, while the roll 204 engages the base 68 and holds the strip between the rolls while maintaining the base layer in a substantially flat position during the pressing operation.

Figure 18:
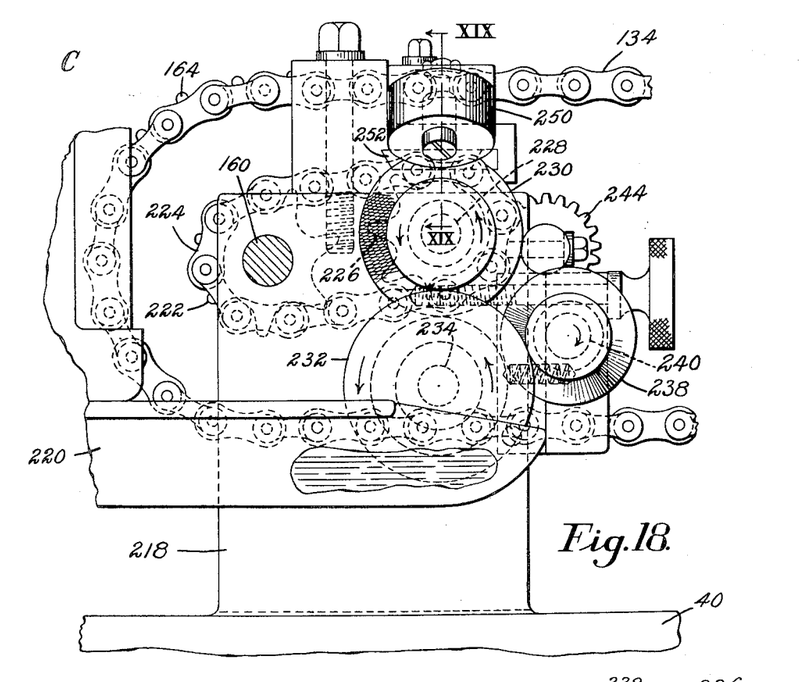
Fig. 18 is a front elevation of the cementing device.
Figure 19:
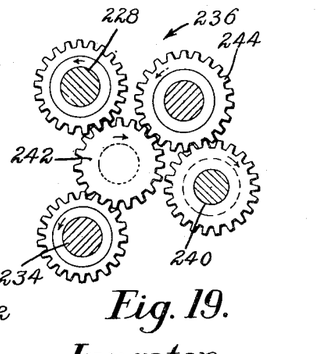
Fig. 19 is a detail view of gears for driving the cementing device.

The strip S leaves the folding device B in substantially the condition shown in Fig. 16 and passes along to the cementing device C, as shown in Fig. 1, this device, as illustrated in Figs. 17 and 18, comprising a base or frame 218 mounted on the platform 40 and provided with a plurality of rolls constructed and arranged to pick up cement from a cement pot or reservoir 220 and apply it to the inner surface of the rib R and the surface of the base or flange 68 adjacent to said inner surface. The cementing device is driven from the motor through the bevel gears 156, 158 through a sprocket 222 (Fig. 18) mounted on the driven shaft 160 and connected by a chain 224 to a sprocket 226 mounted on a shaft 228 journaled in the base 218 and provided with a cement applying roll 230, the peripheral surface of the roll 230 being substantially V-shaped in cross section and adapted to enter the acute angle between the rib and base of the strip and to coat these surfaces thoroughly with cement. A pick-up roll 232 is mounted on a shaft 234 below the cement applying roll 230 and arranged to dip into the reservoir 220 and transfer the cement from the reservoir to the roll 230, the shaft 234 being driven in a counterclockwise direction, as viewed in Fig. 18, through a train of gears 236, illustrated in Figs. 17 and 19. The amount of cement picked up by the roll 232 is controlled by a stripper roll 238 mounted on a shaft 240 and driven in a clockwise direction by the gears 236. In order to cause the three rolls to rotate in the proper directions idler gears 242, 244 are provided in the train 236, as illustrated in Figs. 17 and 19.

Figure 20:
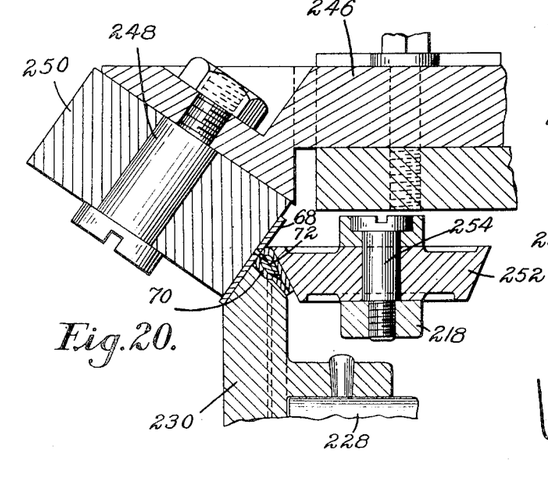
Fig. 20 is an enlarged vertical section through the cement applying rolls of the cementing device.

The base 218 of the cementing device C is of substantially the same construction as the base of the device B and mounted on the upper U-shaped member of the base is a bracket 246 which projects forwardly of the applying roll 230 and has an inclined portion upon which is rotatably mounted on a pin or bolt 248 a cylindrical roll 250 arranged to engage the base 68 of the strip and hold the strip firmly against the applying roll 230 while maintaining the base layer 68 in a substantially flat position during the cement applying operation. The opposite or outer side of the rib R is engaged and supported by a frusto-conical roll 252 (Figs. 17 and 20) rotatably mounted on a pin 254 secured in the base 218. Fig. 20 illustrates the manner in which the roll 230 applies a coating of pressure-responsive cement to the inner side of the rib and to the surface of the base 68 adjacent to said inner side.

After leaving the cementing device C the ribbed strip, as stated above, passes around the large drum 46 (Fig. 1) to permit the cement to dry sufficiently to become tacky and then returns to enter the fourth operating device D of the apparatus, the strip now traveling in a direction opposite to what it traveled when passing through the devices B and C. The reinforcing device D, as indicated above, is constructed and arranged to apply a separate strip of reinforcing material to the cemented portions of the rib and base of the strip as the latter passes progressively through the device, the separate strip of material being preferably supplied from a reel (not shown) mounted on the platform 40 and being guided toward the reinforcing device by means of spools or rolls 256, as illustrated in Fig. 1. The reinforcing strip 258 is conducted into a position to be applied to the multi-ply strip S by a guide 260 mounted on the device D and arranged to receive the reinforcing strip and bend it into an angular position suitable to be applied to the inner surface of the rib and to the surface of the base adjacent to said inner surface.

Figures 21, 22, 23, 24:
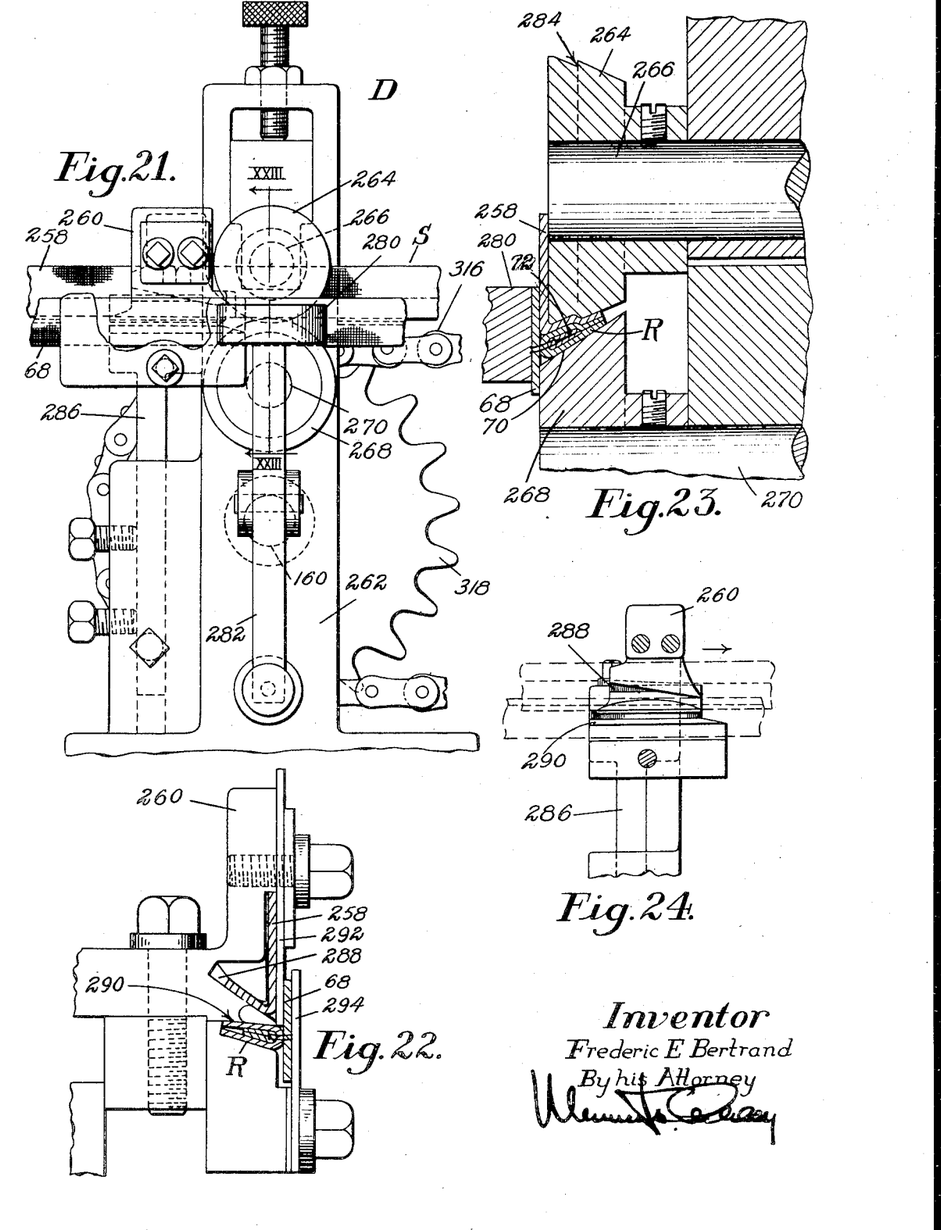
Fig. 21 is a front elevation of the fourth operating device of the apparatus comprising a strip reinforcing device.
Fig. 22 is an enlarged detail of guiding mechanism on the device of Fig. 21.
Fig. 23 is an enlarged vertical section through the rolls of the reinforcing device taken on the line XXIII—XXIII of Fig. 21.
Fig. 24 is a detail view of guiding means shown in Fig. 21 with portions of the mechanism removed.

The reinforcing device is similar to the devices B and C in that it is provided with a base 262 (Figs. 21 and 25) which carries a frusto-conical roll 264 mounted on a rotatable shaft 266 journaled in the base, the roll cooperating with a lower frusto-conical roll 268 mounted on a shaft 270 journaled in the base below the shaft 266. The rolls 264, 268 are driven at equal speeds in opposite directions by means of intermeshing pinions 272, 274 which, in turn, are rotated by the driven shaft 160 through pinions 276, 278. The strip S is held in position between the reinforcing rolls 264, 268 by a cylindrical roll 280 mounted on a lever 282 similar to the lever 208 of the device B. The frusto-conical roll 264, as shown in Fig. 23, is provided around its peripheral surface with a depression or shoulder 284 which is shaped and arranged to force the reinforcing strip 258 firmly against the upper portion of the rib R as well as to press the outer margins of the intermediate layer 70 of the strip into close contact with each other to complete the rib. As illustrated in Fig. 23, the peripheral surface of the lower roll 268 is substantially flat so that the outer surface of the rib, that is, the surface adjacent to the edge face J of the insole in Fig. 31, will be relatively flat or smooth.

Figures 25, 26, 27:
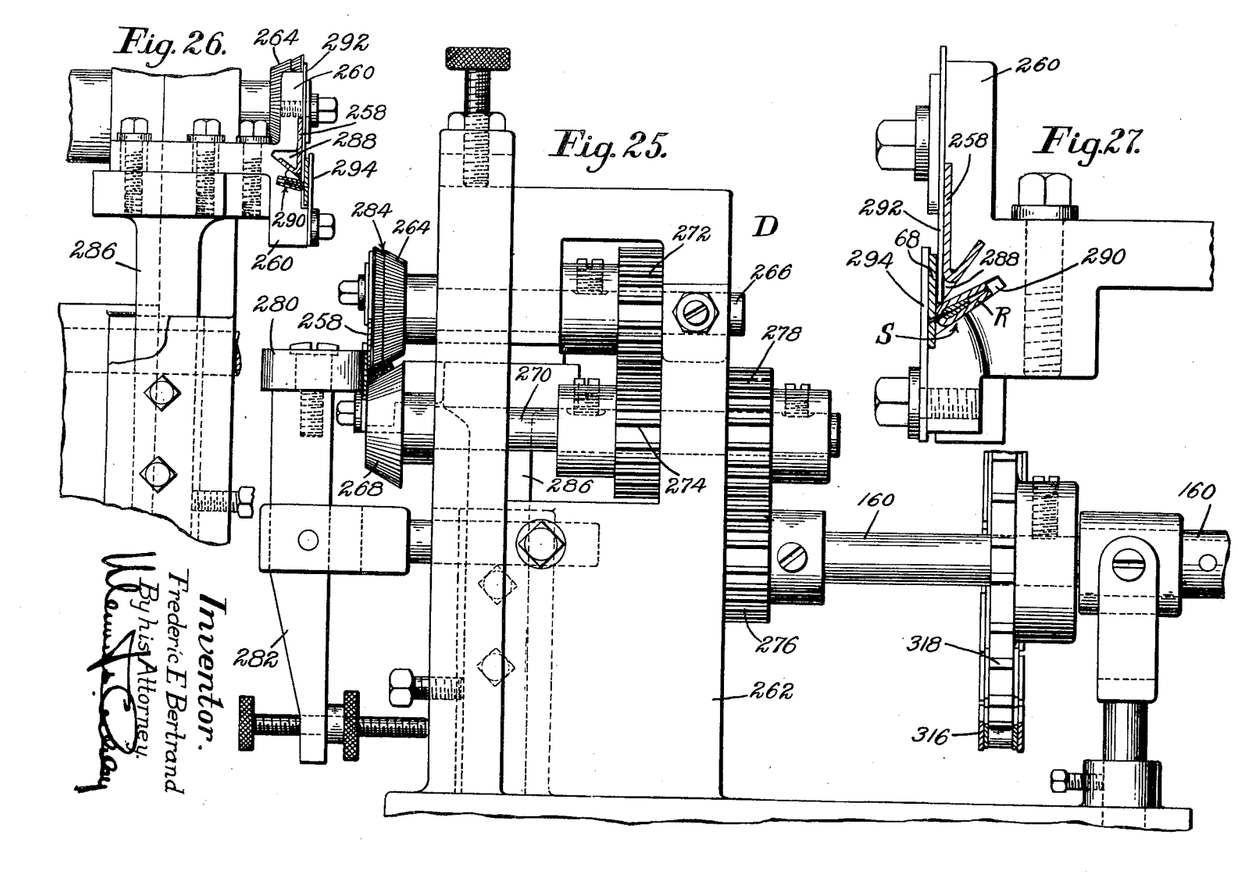
Fig. 25 is a side elevation of the reinforcing device as viewed from the right in Fig. 21.
Fig. 26 is an enlarged detail view of guiding mechanism on the reinforcing device, as viewed from the left in Fig. 21.
Fig. 27 is a further enlarged detail of the guiding mechanism as viewed from the right in Fig. 21.

The guide 260 for conducting the reinforcing strip 258 and the ribbed strip S to the reinforcing rolls 264, 268 is illustrated in detail in Figs. 22, 24, 26 and 27. As shown in these figures, the guide is mounted on a support 286 secured to the base 262 at the left of the reinforcing rolls. The guide is provided with an upper V-shaped slot 288 which is larger at its receiving end than at its other end, as shown in Figs. 22 and 24, and is adapted to receive the reinforcing strip 258 and bend the strip into the angular position illustrated in Figs. 22 and 26. The slot 288 becomes smaller at the right-hand end of the guide, as illustrated in Figs. 24 and 27, and is positioned so that the reinforcing strip 258 is brought closer to the ribbed strip S and is bent into a position to be readily applied to the inner surface of the rib R and the adjacent surface of the base 68.

The guide 260 is provided with another slot 290 below the slot 288 adapted to receive the ribbed strip S and guide it into the reinforcing rolls below the reinforcing strip 258, the slot 290 being separated from the slot 288 by a thin plate 292 and being covered at the front by a plate 294 (Figs. 22 and 27). Accordingly, when the ribbed strip S and reinforcing strip 258 reach the end of the guide 260 and are about to enter the rolls 264, 268, the two strips will be located in the relative positions shown in Fig. 27 and will thus be ready to be brought into actual engagement with each other by the reinforcing rolls, as illustrated in Fig. 23. The reinforcing rolls are rotated at equal speeds in opposite directions by the intermeshing pinions 272, 274 which, in turn, are driven through the pinions 276, 278, from the driven shaft 160.

The reinforced ribbed strip S now passes farther to the right, as viewed in Fig. 1, and enters the last operating device E of the apparatus, this device, as pointed out above, being arranged to apply substantial pressure to the strip to bend the rib over into engagement with the base layer 68 and thus flatten or compress the strip to facilitate handling or reeling it for shipment.

As illustrated in Figs. 28 and 29, the flattening device E is similar in construction to the other devices of the apparatus being provided with a base 296 upon which a pair of flattening rolls 298, 300 are mounted, the rolls being cylindrical in shape and secured respectively to shafts 302, 304 rotatably mounted in the base. The shafts are rotated at equal speeds in opposite directions by intermeshing pinions 306, 308 which, in turn, are driven by pinions 310, 312 from the power drive of the apparatus through a sprocket 314 connected by a chain 316 to a sprocket 318 mounted on the driven shaft 160, the pinion 312 and sprocket 314 being secured to a shaft 320 journaled in bearings in the base 296. As illustrated in Fig. 28, the lower roll 300 is grooved or corrugated widthwise to increase friction and assist in feeding the strip between the rolls.

The ribbed strip S is guided between the rolls 298, 300 by guiding means on the device E comprising a horizontal plate 322 secured by screws to a bracket 324 fastened to the base 296, the plate being bent or offset, as shown in Fig. 28, to overlie the flange portion of the base of the strip adjacent to the inner side of the rib R, the plate and bracket together forming a horizontal slot through which the flange portion travels. An edge gage 326 is provided at the opposite side of the bracket 324 adapted to engage the edge face of the base 68 and guide it between the rolls, the gage having an upper portion overlying the flange at the side of the rib opposite the reinforcement 258, as illustrated in Fig. 28, but leaving an opening between the plate 322 and gage 326 through which the rib R can pass as the strip is guided into the rolls 298, 300. Fig. 30 illustrates the ribbed strip being operated upon by the device E and shows how the rib R is bent over by the rolls 298, 300 into engagement with the inner or reinforced side of the base 68 to flatten the rib and permit the strip to be handled or reeled more easily than if the rib were located in an upstanding position.

After the strip leaves the flattening device E, it travels to the right, as viewed in Fig. 1, and is wound automatically upon a spool or reel 328 carried by the reeling device F referred to above. The reel 328 is removably mounted on a shaft 330 journaled in bearings 332 formed on the platform 40, the reel being caused to rotate with the shaft by a crank 334 secured to the shaft and having a pin 336 engaging a hole in the reel. A sprocket 338, mounted to rotate freely on the shaft 330, is connected by a chain 340 to a sprocket 342 secured to the driven shaft 320 of the flattening device (Figs. 1 and 28) so that the sprocket 338 rotates continuously on the shaft 330 when the apparatus is operating. The hub of the sprocket 338 is engaged by a friction driven member or clutch 344 which is splined or otherwise secured to the shaft 330 and is normally urged into engagement with the sprocket by a compression spring 346, the opposite end of the spring pressing against the fixed bearing 332. A bushing or sleeve 348 is interposed between the sprocket 338 and a vertical plate 350 to take the thrust of the spring 346, the plate 350 being adjustably secured to the bearing by a pair of screws 352 whereby the tension of the spring 346 may be varied.

The foregoing construction causes the reel 328 to rotate continuously to wind the strip S thereon. As the diameter of the windings increases, the friction member 344 permits slippage to occur between the constantly rotating sprocket 338 and the shaft 330 so that the crank 334 will rotate the reel 328 only as fast as is necessary to wind up the strip being delivered to it, thereby causing the strip to be wound upon the reel with substantially uniform tension as it leaves the flattening device E notwithstanding the varying size of the windings on the reel.

Fig. 31 illustrates the completed ribbed strip S as it would appear attached to the outer surface of an insole I with the reinforcing layer 258 extending inwardly with respect to the edge J of the insole. When drawn from the reel 328, the flattened rib R tends to return toward an upright position relatively to the base 68 and, during its application to the insole, is preferably made to assume an angle of approximately 60° to the reinforced flange or base 68. The rib is permanently attached to the base by the lockstitches L and the layers or plies forming the rib, that is, the inner layer or core 72 and the outer layer 70, adhere firmly to each other to provide a relatively solid rib of substantial thickness. The reinforcing layer 258 covering the inner side of the rib further increases its thickness and stiffness. The reinforcement also covers the flange or base portion 68 inwardly of the rib and extends beyond the base portion a substantial distance to provide a wide reinforcement for the body of the insole as well as to insure that the attachment of the strip to the outer surface of the insole will be permanent. As stated above, the ribbed strip S may be applied to an insole manually or by an attaching machine such as that disclosed in my prior patent referred to above, the pressure-responsive cement C on the base 68 and reinforcing strip 258 causing immediate adhesion of the strip with the insole I (Fig. 31) when the insole has a band of pressure-responsive cement on its outer surface.

Having thus described my invention, what I claim as new and desire to secure by Letters Patent of the United States is:

1. In an apparatus for use in the manufacture of ribbed strips, comprising a plurality of layers, adapted for attachment to insoles to provide sewing ribs thereon, the combination of a folder provided with a guideway for a multi-ply strip, mechanism carried by the folder for folding layers of the strip toward each other while holding another layer in an unfolded condition, a plurality of rolls for drawing the strip progressively through the guideway and folding mechanism and for thereafter pressing the folded layers together to form a rib, means for applying cement to portions of the strip, and means for attaching a separate strip of material to the cemented portions of the strip to reinforce said strip.

2. In an apparatus for use in the manufacture of ribbed strips, comprising a plurality of pre-cemented layers, adapted for application to insoles to provide sewing ribs thereon, the combination of a stationary folder provided with a guideway for receiving a multi-ply strip, mechanism projecting from the folder into the guideway for folding layers of the strip to form a rib while maintaining one layer of the strip in an unfolded condition to provide a base for the rib, a plurality of continuously operating rolls for drawing the strip progressively through the folding mechanism and for pressing the rib, means for applying cement to one side only of the rib and a surface of the base, and means for securing a strip of reinforcing material to the cemented surfaces, said means including a guide for the reinforcing strip, and constantly rotating means for pressing said strip against said cemented surfaces during the progressive movement of the multi-ply strip.

3. In an apparatus for use in the manufacture of ribbed strips, comprising a plurality of layers, adapted for application to insoles to provide sewing ribs thereon, the combination of stationary folding mechanism for folding the opposite margins of layers of a multi-ply strip toward each other while holding one layer in an unfolded condition to provide a base for the strip, a plurality of rolls for drawing the strip progressively through the folding mechanism and for pressing the folded layers together to form a rib during their progressive movement, said rolls including a roll for supporting the unfolded strip in a flat condition, means for progressively applying cement to one side only of the rib and to a surface of the base adjacent to the rib, and means for progressively applying a separate strip of material to the cemented portions of the rib and base to reinforce said portions, said means including a guide for the folded strip and rolls for pressing the reinforcing strip against said rib and base.

4. In an apparatus for use in the manufacture of ribbed strips, comprising a plurality of superimposed layers, adapted for attachment to insoles to provide sewing ribs thereon, said layers being secured together along their longitudinal median portion, the combination of a folder for folding the free margins of the upper layers of the multi-ply strip toward each other while holding the lower layer in an unfolded condition to provide a base for the strip, a plurality of rolls for drawing the strip progressively through the folder while maintaining the unfolded layer in a substantially flat position and for pressing the folded margins of said upper layers together to form a rib, a roll for applying cement to one side of the rib and to the surface of the base adjacent to said side, means for progressively securing a reinforcing strip to the cemented portions of the rib and base to reinforce said portions, said means including a guide for conducting the reinforcing strip to the ribbed strip, said guide also acting to bend the reinforcing strip into position to be applied to said rib and base, and means adjacent to said guide for pressing the reinforcing strip against said rib and base during the progressive movement of the ribbed strip.

5. In an apparatus for use in the manufacture of ribbed strips, comprising a plurality of superimposed interconnected layers, adapted for attachment to insoles to provide sewing ribs thereon, the combination of a stationary folder for folding the opposite margins of the upper layers of the strip toward each other while holding the lower layer in an unfolded condition, a plurality of power-operated rolls for drawing the strip progressively through the folder while maintaining the unfolded layer in a substantially flat position to provide a base for the strip, said rolls acting also to press the folded margins of said upper layers together to form a rim, a roll for applying cement progressively to the inner side of the rib and to the surface of the base adjacent to said inner side, means for guiding and securing a separate strip of reinforcing material to the cemented side of the rib and the adjacent surface of the base to reinforce the ribbed strip, and means for actuating said power-operated rolls, the cement applying roll and the guiding and securing means from a single source of power.

6. In an apparatus for use in the manufacture of ribbed strips adapted for attachment to insoles to provide sewing ribs thereon, said strip comprising a plurality of superimposed layers secured together along their central portions, the upper surfaces of the upper layers and the lower surface of the lower layer having cement thereon, the combination of a stationary folder for folding the free margins of said upper layers toward each other while holding the lower layer unfolded, a plurality of driven rolls for drawing the strip progressively through the folder and for pressing the folded margins together to cause them to adhere to form a rib, said rolls being constructed and arranged to maintain the unfolded layer in a substantially flat position to provide a base for the rib, driven rolls for applying cement to the inner side of the rib and to the surface of the base adjacent to said inner side, and means for guiding, positioning and pressing a separate strip of material against the cemented inner side and adjacent surface of the ribbed strip to reinforce said rib and base, said means being constructed and arranged to position said separate strip so that it extends beyond said adjacent surface to provide a reinforcement for the insole.

7. In an apparatus for use in the manufacture of ribbed strips adapted for attachment to insoles to provide sewing ribs thereon, said strip comprising a plurality of superimposed layers stitched together at their mid portions, the combination of mechanism for folding the free margins of the upper layers of the strip together to form a rib while holding the lower layer in an unfolded condition to provide a base for the rib, a plurality of rolls for drawing the strip through the folding mechanism and for pressing the rib, a roll for applying cement to one side of the rib and to a surface of the base adjacent to said side, means for guiding a separate strip of material to the ribbed strip in position to engage the cemented side of the rib and the adjacent surface of the base, and power-operated means including a plurality of rolls for progressively pressing the separate strip against said cemented side and adjacent surface to cause the strip to adhere thereto and reinforce said rib and base, said means acting also to feed the ribbed strip and reinforcing strip in unison and to maintain the base layer of said ribbed strip in a substantially flat position during the reinforcing operation.

8. In an apparatus for use in the manufacture of ribbed strips adapted for attachment to insoles to provide sewing ribs thereon, said strip comprising a plurality of superimposed layers secured together along their longitudinal median portions, the combination of folding mechanism for folding the opposite margins of the upper layers of the strip toward each other to form a rib while holding the lower layer in an unfolded condition, a roll for applying cement to one side of the rib and to a portion of the unfolded layer adjacent to said side, a rotatable drum for moving the strip from the cementing roll with the cemented portions exposed to the air for a period of time sufficient to permit the cement to dry, a guide for directing a strip of reinforcing material to the ribbed strip in position to engage said cemented portions, means for feeding the ribbed strip and reinforcing strip at equal speeds through the guide and for pressing the reinforcing strip against said cemented portions to cause it to adhere thereto, and means for operating the cement applying roll, the drum and said feeding means from a single source of power.

9. In an apparatus for use in the manufacture of ribbed strips adapted for attachment to insoles to provide sewing ribs thereon, said strip comprising a plurality of superimposed layers secured together along their mid portions, the combination of a folding member shaped and arranged to fold the opposite margins of the upper layers of the strip toward each other while holding the lower layer in an unfolded condition to form a base for the strip, a plurality of rolls for drawing the strip progressively through the folding member and for pressing the folded margins of the upper layers together to form an upstanding rib, rotary means for applying cement to the inner side of the rib and to the surface of the base adjacent to said inner side, a guide for conducting a strip of reinforcing material to the ribbed strip in position to engage the inner side of the upstanding rib and the surface adjacent to said inner side, rolls for pressing the reinforcing strip against the rib and base to cause it to adhere from the cement thereon and reinforce said rib and base, and means for pressing the upstanding rib downwardly against the reinforced surface of said base to put the strip into a flatter condition.

10. That improvement in methods of making ribbed strips adapted for attachment to insoles to form sewing ribs thereon which consists in providing a strip comprising a plurality of superimposed layers of indefinite length stitched together along their mid portions, moving the multi-ply strip in a predetermined path, folding the free margins of the upper layers of the strip toward each other during such movement while holding the lower layer in an unfolded condition, progressively pressing the folded portions of said upper layers together during said movement to form an upstanding rib while maintaining the lower layer in a substantially flat position to form a base for said rib, guiding a reinforcing layer progressively to the inner side of the rib and to the surface of the base layer adjacent to said inner side and securing the reinforcing layer to said inner side and adjacent surface, said reinforcing layer extending beyond said adjacent surface to provide a reinforcement for the insole, and pressing the strip to bend the upstanding rib downwardly against the base layer and thereby to cause the rib thereafter to assume a permanently inclined position relatively to said base layer.

11. That improvement in methods of making ribbed strips adapted for attachment to insoles to provide sewing ribs thereon which consists in providing a strip comprising a plurality of superimposed layers of indefinite length secured together along their mid portions, folding the opposite margins of the upper layers of the strip progressively toward each other while moving the strip in a predetermined path, pressing the folded margins of said upper layers together during said movement to form an upstanding rib while maintaining the lower layer in a substantially flat position to provide a base for the rib, applying cement to the inner side only of the rib and to the surface of the base adjacent to said inner side, progressively applying a separate strip of material to the cemented side of the rib and adjacent surface of the base during movement of the strip to reinforce said rib and base, pressing the strip progressively to force the upstanding rib against said base and thereby flatten the strip, and winding the flattened strip upon a reel as soon as the flattening operation has been completed, thereby tending to maintain the ribbed strip in its flattened condition until ready to apply to an insole.

FREDERIC E. BERTRAND.

REFERENCES CITED

The following references are of record in the file of this patent:

UNITED STATES PATENTS

| Number | Name | Date |
|---|---|---|
| 1,088,138 | Firsching | Feb. 24, 1914 |
| 1,417,651 | Woehr | May 30, 1922 |
| 2,264,707 | Meyer | Dec. 2, 1941 |
| 2,331,067 | Young | Oct. 5, 1943 |
| 2,381,951 | Griswold | Aug. 14, 1945 |
| 2,427,739 | Paulsen | Sept. 23, 1947 |

Certificate of Correction

Patent No. 2,529,793                                          November 14, 1950

FREDERIC E. BERTRAND

It is hereby certified that error appears in the printed specification of the above numbered patent requiring correction as follows:

Column 12, line 65, after the word "base" and before the comma insert *adjacent to said side;* and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*